United States Patent [19]
Stringer

[11] Patent Number: 6,019,149
[45] Date of Patent: Feb. 1, 2000

[54] WHEEL SEAL AND METHOD

[76] Inventor: Raymond E. Stringer, 1153 S. Lipan St., Denver, Colo. 80223

[21] Appl. No.: 09/392,368

[22] Filed: Sep. 8, 1998

[51] Int. Cl.[7] .................................................. B60B 21/02
[52] U.S. Cl. .......................................... 152/381.5; 301/97
[58] Field of Search .............................. 152/381.6, 381.5, 152/381.3; 301/95, 96, 97, 98, 58; 29/894.341, 894.333

[56] References Cited

U.S. PATENT DOCUMENTS

| | | |
|---|---|---|
| 1,822,568 | 9/1931 | Eger . |
| 3,008,770 | 11/1961 | Mueller . |
| 3,335,778 | 8/1967 | Blagden et al. . |
| 4,108,232 | 8/1978 | Simpson . |
| 4,150,854 | 4/1979 | Lohmeyer . |
| 4,289,186 | 9/1981 | Wilde . |
| 4,305,622 | 12/1981 | Mitchell . |
| 4,448,456 | 5/1984 | Pfundstein ............................... 301/108 |
| 4,602,665 | 7/1986 | Sacks ........................................ 152/375 |
| 4,824,177 | 4/1989 | Aloy .......................................... 301/97 |
| 4,992,334 | 2/1991 | Kindt et al. ............................... 428/489 |
| 5,028,487 | 7/1991 | Kindt et al. ............................... 428/489 |
| 5,538,058 | 7/1996 | Aloy ....................................... 152/381.5 |
| 5,580,630 | 12/1996 | Byrd .......................................... 428/47 |
| 5,820,709 | 10/1998 | Matsuda .................................... 152/501 |
| 5,840,109 | 11/1998 | Braga et al. .......................... 106/273.1 |

Primary Examiner—S. Joseph Morano
Assistant Examiner—Long Bao Nguyen
Attorney, Agent, or Firm—Ancel W. Lewis, Jr.

[57] ABSTRACT

A seal for sealing openings in a wheel rim for a spoked wheel and a method of sealing a spoked wheel are disclosed. The seal has a flexible solid adhesive body and a polymer cover. The seal is applied at ambient temperatures and remains flexible. The seal is wrapped around a wheel rim over openings in the wheel rim of a spoked or wire wheel to seal the openings so that the wheel can be used with a tubeless tire without leakage of air.

19 Claims, 1 Drawing Sheet

WHEEL SEAL AND METHOD

TECHNICAL FIELD

The present invention relates to wheel seals and more particularly to a wheel seal to seal a wheel rim to make a spoked wheel suitable for use with a tubeless tire.

BACKGROUND ART

Tubeless tires have many advantages over tires that require inner tubes, including greater simplicity, lower weight and lower heat buildup. The wheel rims on certain types of wheels, such as spoked or wire wheels, are generally not sealed and an inner tube is required.

Spoked wheels with pneumatic tires have a variety of applications, including automobiles, motorcycles, bicycles, wheelchairs and baby strollers. Spoked wheels include a hub, spokes and a wheel rim. The spokes are generally connected to the wheel rim with nipples that extend through openings in the wheel rim and screw onto the threaded outer ends of the spokes. Air can leak through the nipple openings in the wheel rim and therefore most prior spoked rims have used tires with inner tubes. In order to use a tubeless tire with a spoked wheel, the openings in the wheel rim must be isolated from the pressurized air chamber of the tire and wheel combination with a fluid impermeable barrier.

Rim strips that protect an inner tube from chafing against the nipple openings and the nipple ends are known. U.S. Pat. No. 1,822,568 to Eger discloses one such rim strip. Such rim strips do not provide a fluid impermeable barrier between the openings in the wheel rim and the pressurized air chamber of the tire and wheel combination.

Molded bands of elastic material that are stretched around a wheel rim have been used to seal spoked wheels. These bands extend across the width of the U shaped channel formed by the flanges of the wheel rim and are held in place by the beads of the tire. These bands may require special wheels. These band may not be compatible with regular tire mounting equipment, and may be torn or dislocated during tire mounting. U.S. Pat. No. 4,108,232 to Simpson, U.S. Pat. No. 4,289,186 to Wilde and U.S. Pat. No. 3,335,778 to Blagden et al. each disclose molded elastic band seals for spoked wheels.

Bands of liquid adhesive, such as curable silicone or molten thermoplastic, that is subsequently cured or hardened, have been used to seal the nipple openings in spoked wheels. These adhesives must be precisely applied with special equipment and special procedures in order to avoid creating an severely unbalanced wheel rim. The bands of liquid adhesive are applied by dripping or spraying onto a rotating wheel rim. The curable adhesives require a cure period, generally six to twenty-four hours. The cured or hardened adhesive band can prevent rotation of the nipples and therefore prevent retentioning of the spokes. U.S. Pat. No. 4,150,854 to Lohmeyer and U.S. Pat. No. 4,305,622 to Mitchell each disclose spoked wheels with thermoplastic bands.

Special spoked wheels have been made for tubeless tires. Some of these wheels have an inner rim with nipple openings and an outer rim without nipple openings. After the nipples are installed in the nipple openings of the inner rim, the outer rim is formed or fastened over the inner rim. These wheels are more complex, require more complex manufacturing equipment and may be heavier than conventional spoked wheels. U.S. Pat. No. 3,008,770 to Mueller discloses a dual rim wheel.

DISCLOSED OF THE INVENTION

A seal for a spoked wheel to make the wheel suitable for use with a tubeless tire and a method of sealing a spoked wheel are disclosed. The seal includes an elongated body of solid adhesive material with a uniform cross section of substantial thickness. The body has a first face and a second face opposite the first face. The body wraps around and conforms to irregularities in the well of the wheel rim, with the first face covering openings in the well, adhering to the well and sealing the openings. The seal also includes a non-elastic, non-adhesive film cover attached to the second face of the body opposite the well of the wheel rim. Opposed first and second ends of the body preferably overlap when the body is applied to the well of the wheel rim. The seal can be applied to conventional wheels without special equipment and is particularly suitable for sealing spoked wheels to make suitable for use with a tubeless tire. The method includes providing a spoked wheel and the seal, wrapping the seal around the wheel rim and pressing the seal against the wheel rim.

BRIEF DESCRIPTION OF THE DRAWINGS

Details of this invention are described in connection with the accompanying drawings that bear similar reference numerals in which.

DETAILED DESCRIPTION OF THE INVENTION

Figure 1:
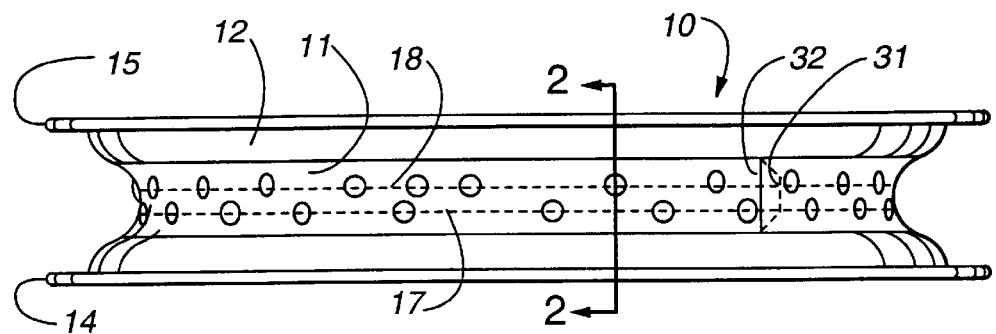
FIG. 1 is a top elevational view of a spoked motorcycle wheel with a seal embodying features of the present invention.
Figure 2:
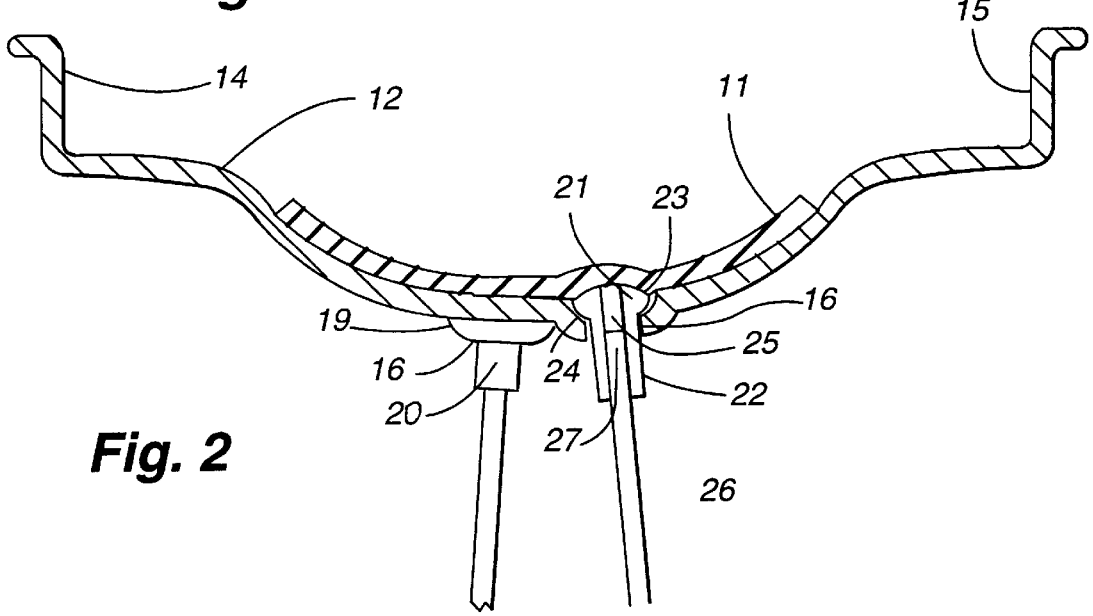
FIG. 2 is an enlarged sectional view taken along line 2—2 of the wheel rim and seal of FIG. 1.

Referring now to FIGS. 1 and 2, a wheel rim 10 for a spoked motorcycle wheel with a seal 11 embodying features of the present invention is shown. The wheel rim 10 has a well 12 with a generally concave outward cross section relative to a wheel center, and outwardly extending first and second flanges 14 and 15 attached to opposite ends of well 12. A plurality of round openings 16 are circumferentially spaced around well 12. Openings 16 in the illustrated embodiment are shown in laterally spaced first and second rows 17 and 18. Other spoked wheels may have a single row.

A spoke assembly for the wheel includes nipples 20 which are generally mushroom shaped with an upper head portion 21 and an elongated lower stem portion 22. The head portion 21 has a rounded upper face 23 connected to a lower face 24 having a substantially semicircular cross section. The upper face 23 of the head portion 21 preferably includes a slot to receive a screw driver to rotate nipple 20. The stem portion 22 is connected to and extends perpendicularly from the center of the lower face 24. The stem portion 22 has a square cross section to receive a wrench to rotate nipple 20. A cylindrical threaded bore 25 extends through stem portion 22 and the center of head portion 21.

The head portion 21 of nipples 20 is sized larger than openings 16 in the well 12. The stem portion 22 of nipples 20 is sized smaller than openings 16 in the well 12 and extends inwardly therethrough with the head portion 21 on the outside of well 12. Dimples 19, having a substantially semicircular cross section, are formed in well 12 around openings 16 to receive the head portion 21 of nipples 20, with the upper face 23 of head portion 21 protruding slightly into well 12. The spoke assembly further includes an elongated cylindrical spoke 26 having a threaded outer end 27 that threads into threaded bore 25 of nipple 20 to connect the spoke 26 to the wheel rim 10. Nipples 20 are rotated to tension spokes 26 and true the wheel rim 10.

Figure 3:
FIG. 3 is a top elevational view of a seal embodying features of the present invention, before application to a wheel rim.

Referring to FIG. 3, the seal 11, before attachment to wheel rim 10, is initially a flexible flat strip of uniform thickness having a long, generally rectangular shape with a first end 31 and second end 32. A portion of both corners of first end 31 are cut at about forty-five degrees to form a beveled first end 31. Seal 11 is sized to have a length preferably greater than the circumference of well 12 so that second end 32 will overlap first end 31 when seal 11 is wrapped around well 12. Seal 11 has a width greater than the lateral distance between first and second rows 17 and 18 of openings 16. On a narrow wheel rim 10, the width of seal 11 may be selected as the distance between first and second flanges 14 and 15 so that seal 11, when assembled to the wheel rim 10, extends across the entire width of the well 12.

Figure 4:
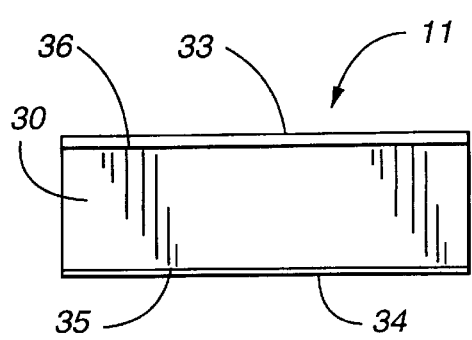
FIG. 4 is an end view of the seal of FIG. 3.
Figure 5:
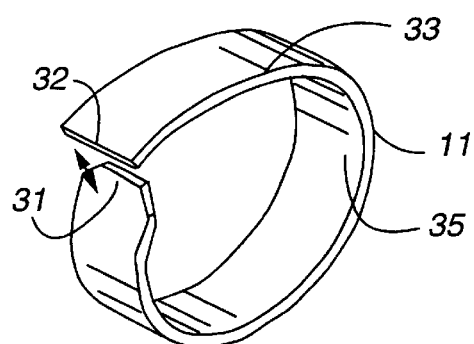
FIG. 5 is a perspective view of the seal of FIG. 3, wrapped around without a wheel rim.

FIG. 4 shows seal 11 including a body 30, a cover 33 and a disposable release film 34. The body 30 shown has a uniform, rectangular cross section with a first face 35 and a second face 36. Body 30 is made of a conformable or flexible, fluid impermeable, cold applied, solid adhesive material such as rubberized asphalt adhesive and has a substantial thickness, greater than the protrusion of the head portion 21 of the nipples 20 into well 12. Cover 30 attaches to and covers the second face 36 of body 30. Cover 33 is made of a substantially inelastic film or mesh material of a polymer such as polyethylene, polyolefin or polypropylene, and is significantly thinner than body 30. Release film 34 covers the first face of body 30 during shipping and before application of seal 11 to well 12. By way of example, and not limitation, seal 11 may be made from Bituthene® 3000 from W. R. Grace of Cambridge, Mass., with body 30 being about 1.4 mm thick and cover 33 being about 0.1 mm thick. The body 30 of Bituthene® 3000 has a composition including, by weight, 30% to 55% asphalt and 15% to 35% processed napthenic oil and the cover 33 is a cross-laminated high density polyethylene film.

Seal 11 is assembled to wheel rim 10 at ambient temperatures and can be applied without special tools or equipment. To assemble the seal 11 to wheel rim 10, first a short section of the release film 34 is pulled away from the body 30 at first end 31, first end 31 is centered in well 12 and first end 31 is pressed against well 12. First end 31 is preferably placed in well 12 at a position on the wheel rim 10 opposite the air valve stem to minimize any imbalance from the subsequent overlap of the second end 32 and first end 31. Next a light coat of a solution of soap and water is sprayed around well 12. The remaining release film 34 is then removed from seal 11 and seal 11 is wrapped around well 12 over openings 16 with second end 32 overlapping first end 31. The solution of soap and water allows the seal 11 to be moved slightly for final placement and alignment. The seal 11 is next pressed against well 12 and the solution of soap and water evaporates through openings 16, so that the adhesive characteristics of body 30 secure seal 11 to well 12 to seal openings 16.

Body 30 is conformable so that openings 16 will be sealed independent of the shape of the well 12 of the wheel rim 10. The uniform cross section of seal 11 provides equal weight distribution around the wheel rim 10 and thereby minimizes wheel imbalance. Body 30 is not brittle and will not crack or chip from vibration of the wheel rim 10 or the spokes 26. Although body 30 adheres to the upper face 23 of the head portion 21 of the nipples 20 and thereby inhibits rotation of nipples 20 due to vibration of the wheel rim 10 or the spokes 26, nipples 20 can be turned to tension spokes 26 and true wheel rim 10 without removal of seal 11 and without destroying the seal around openings 16. Cover 33 allows convenient application of seal 11 without sticking to person applying the seal 11, and also prevents excess deformation of body 30 at higher wheel operating temperatures.

Although the present invention has been described with a certain degree of particularity, it is understood that the present disclosure has been made by way of example and that changes in details of structure may be made without departing from the spirit thereof.

What is claimed is:

1. A seal for a wheel having a wheel rim with a well having openings comprising:

an elongated body of a conformable, fluid impermeable, solid adhesive first material, said body being dimensioned to extend around said well and cover said openings, said body being preconfigured as a flexible flat strip with a uniform cross section, said body having a first face and a spaced second face opposite said first face, said first face adhering to an external surface of said well and covering said openings to seal said openings when said body is applied to the wheel rim, and a cover of a non-elastic, film type second material, said cover covering said second face, said adhesive first material securing said cover to said second face.

2. The seal as set forth in claim 1 wherein said first material is rubberized asphalt adhesive.

3. The seal as set forth in claim 2 wherein said rubberized asphalt adhesive includes, by weight, 30% to 55% asphalt and 15% to 35% processed napthenic oil.

4. The seal as set forth in claim 1 wherein said second material is a polymer film.

5. The seal as set forth in claim 4 wherein said polymer film is a cross-laminated high density polyethylene film.

6. The seal as set forth in claim 1 wherein said body has a rectangular cross section.

7. The seal as set forth in claim 1 wherein said body has a first end and a second end, and said second end overlaps said first end when said body is applied to the wheel rim.

8. The seal as set forth in claim 1 further comprising a release film on said first face that is removed before said body is applied to said wheel rim.

9. A wheel assembly for a tubeless tire comprising:

a wheel rim having a well with a plurality of openings, and a seal having an elongated flexible body of conformable, fluid impermeable, solid adhesive extending around said well and covering said openings, said body having a first face facing said well and securing said body to said well to seal said openings, and a spaced second face opposite said first face, said body having a first end and a second end opposite said first end, said first and second ends being in proximate relationship on said wheel rim, said seal having a cover attached over said second face.

10. The wheel assembly as set forth in claim 9 wherein said first end of said body overlaps said second end of said body.

11. The wheel assembly as set forth in claim 9 further comprising a spoke for each said opening, each said spoke having a spoke nipple that extends through said opening and connects said spoke to said wheel rim.

12. A wheel assembly for a tubeless tire comprising:

a wheel rim having a well with a plurality of openings, a spoke for each said opening, each said spoke having a spoke nipple that extends through said opening and connects said spoke to said wheel rim, and a seal having an elongated body of rubberized asphalt adhesive extending around said well and covering said openings, said body having a first face facing said well and securing said body to said well to seal said openings, and a spaced second face opposite said first face, said body having a first end and a second end opposite said first end, said first and second ends being in proximate relationship on said wheel rim, said seal having a cover of polymer film attached over said second face.

13. A method of sealing a wheel to make the wheel suitable for use with a tubeless tire comprising the steps of:

providing a wheel with a wheel rim having a well with a plurality of openings, providing a seal having an elongated flexible body of conformable, fluid impermeable, solid adhesive, said body having a first face and a spaced second face opposite said first face, said body having a first end and a second end opposite said first end, said seal having a cover attached over said second face, wrapping said seal around said wheel rim with said first face facing said openings, and pressing said first face over said openings to seal said openings.

14. The method as set forth in claim 13 further including the step of overlapping said second end over said first end.

15. The method as set forth in claim 13 further including the steps of:

spraying said well with a solution of soap and water before wrapping said seal around said wheel rim, and aligning said seal on said wheel rim after wrapping said seal around said wheel rim.

16. The method as set forth in claim 13 wherein said wheel is a spoked wheel and said openings are provided for spoke nipples for attaching spokes to said wheel rim.

17. The method as set forth in claim 13 wherein said solid adhesive is rubberized asphalt adhesive.

18. The method as set forth in claim 13 wherein said cover is made of an inelastic polymer film.

19. A method of sealing a spoked wheel to make the wheel suitable for use with a tubeless tire comprising the steps of:

providing a spoked wheel with a wheel rim having a well with a plurality of openings for nipples for attaching spokes to said wheel rim, providing a seal having an elongated flexible body of rubberized asphalt adhesive, said body having a first face and a spaced second face opposite said first face, said body having a first end and a second end opposite said first end, said seal having a cover of an inelastic polymer film attached over said second face, spraying said well with a solution of soap and water, after spraying said well, wrapping said seal around said wheel rim with said first face facing said openings, after wrapping said seal, aligning said seal on said wheel rim, overlapping said second end over said first end, and pressing said first face over said openings to seal said openings.

* * * * *

UNITED STATES PATENT AND TRADEMARK OFFICE
CERTIFICATE OF CORRECTION

PATENT NO : 6,019,149
DATED : February 1, 2000
INVENTOR(S): Raymond E. Stringer

It is certified that error appears in the above-identified patent and that said Letters Patent is hereby corrected as shown below:

Title page, item [22],
The filing date of September 8, 1998 should be changed to September 8, 1999.

Signed and Sealed this

Third Day of October, 2000

Attest:

Q. TODD DICKINSON

*Attesting Officer*     *Director of Patents and Trademarks*